Dec. 17, 1968    J. B. P. WILLIAMSON    3,417,323
METHOD AND APPARATUS FOR DETERMINING CONSTRICTION
RESISTANCE OF ELECTRICAL CONTACT INTERFACES
Filed June 14, 1965    2 Sheets-Sheet 1
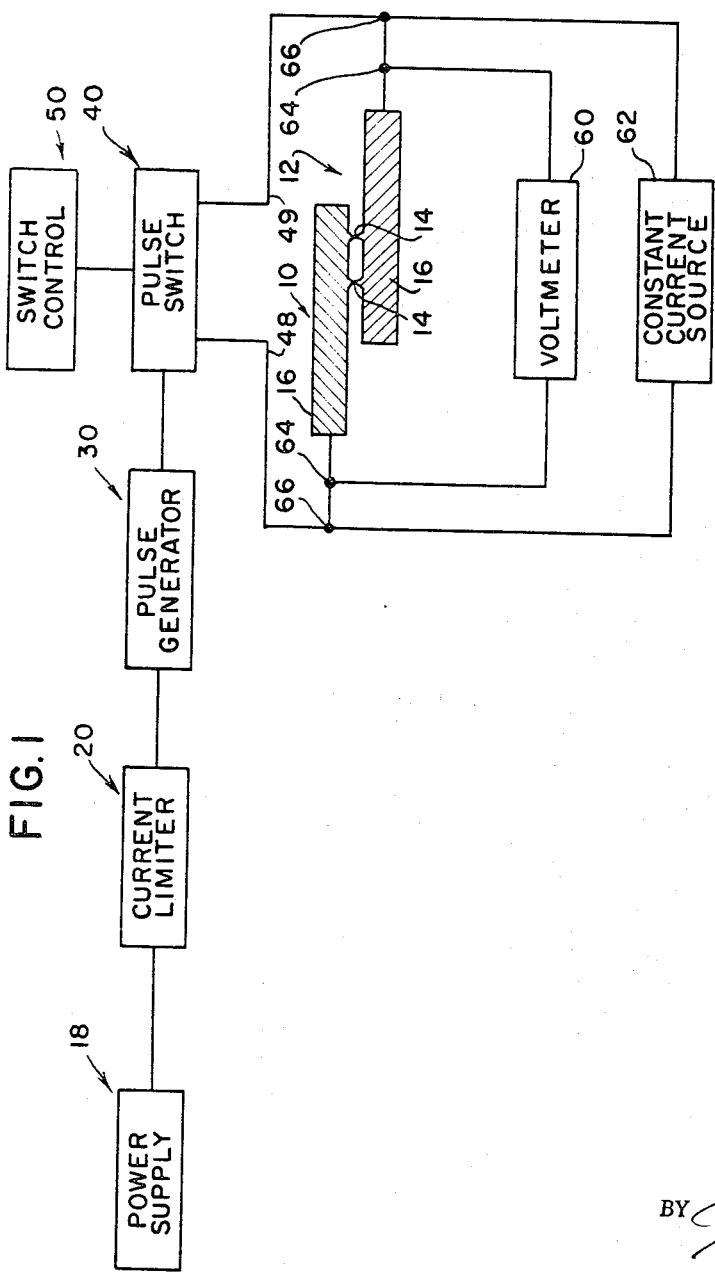
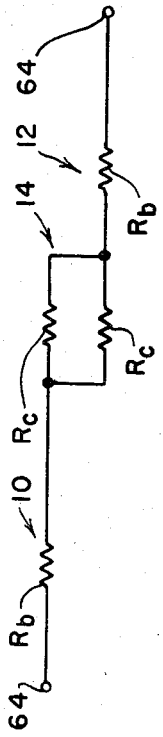
INVENTOR.
J.B.P. WILLIAMSON
BY
ATTORNEY

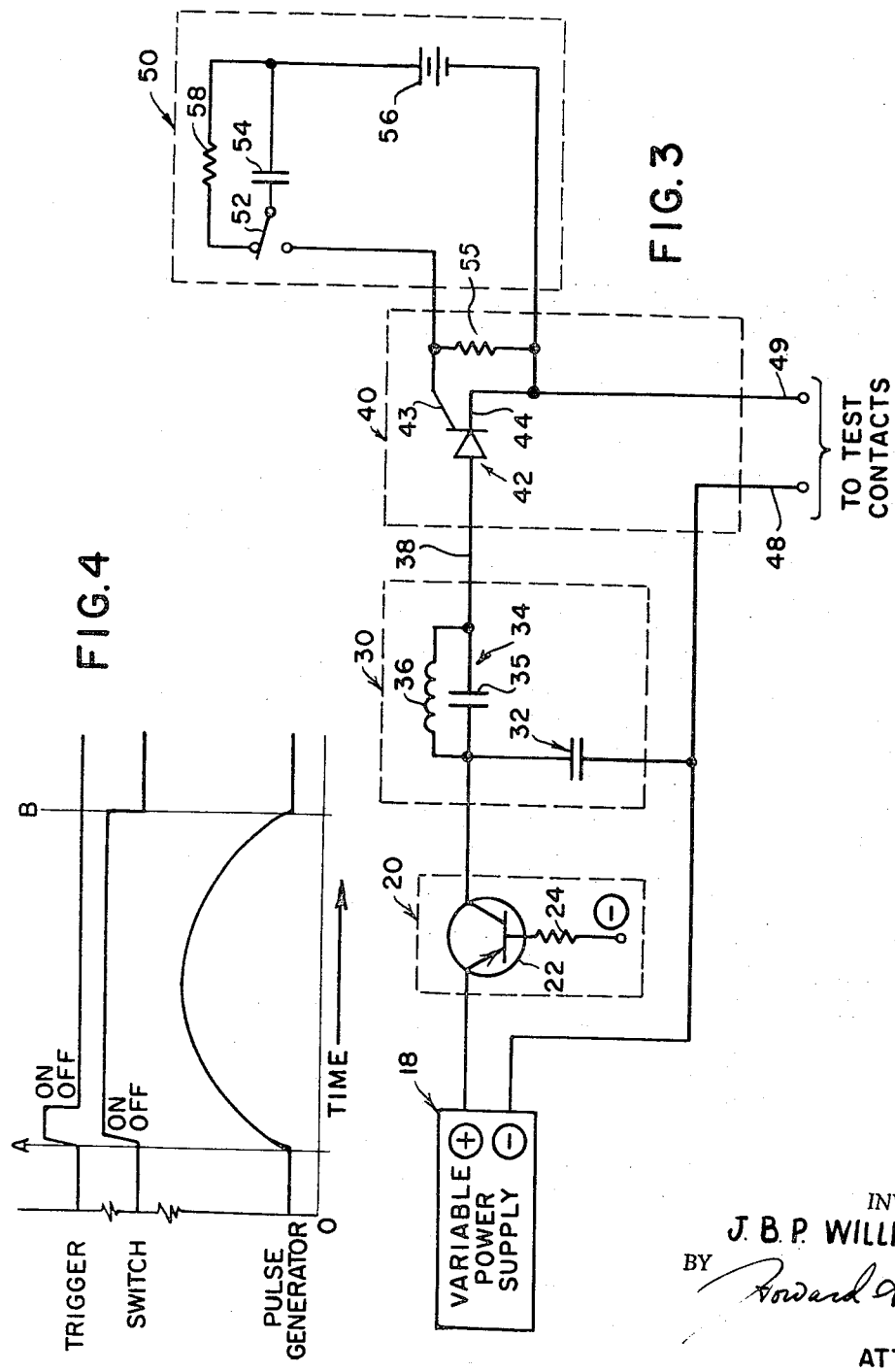

United States Patent Office 3,417,323
Patented Dec. 17, 1968

3,417,323
METHOD AND APPARATUS FOR DETERMINING CONSTRICTION RESISTANCE OF ELECTRICAL CONTACT INTERFACES
John B. P. Williamson, Wilton, Conn., assignor to Burndy Corporation, a corporation of New York
Filed June 14, 1965, Ser. No. 463,518
8 Claims. (Cl. 324—28)

ABSTRACT OF THE DISCLOSURE

A method and apparatus for determining the electrical constriction resistance present in a test circuit at the interface formed between two contacting bodies of known materials. Electrical pulses of short duration are employed for the purpose of producing electrical resistance heating at the interface during a time period substantially shorter than the thermal response time of the bulk resistance of the bodies. The current amplitude of the pulse which first causes a change in the constant current potential drop across the test circuit can be related to the known melting voltage of the two bodies to establish the constriction resistance. A suitable apparatus is disclosed as employing: a source of constant current for producing a potential drop across the test circuit; a potential measuring means for detecting when changes occur in the potential drop across the test circuit; and a pulse generator for applying pulses of known amplitude which cause electrical resistance heating at the interface of the test circuit to alter the constriction resistance.

---

This invention pertains generally to a method and apparatus for determining certain electrical characteristics of electrical contacts; more particularly, it relates to measurement of the resistance present at the interface between two contacting conductive bodies.

In general, the objective of any electrical connection is to bring two conductors together in such a way that electrons in the atomic lattice of one can pass freely into the lattice of the other. It is thus desirable to bring two conductors together so that their lattices touch as intimately as possible.

It is known that the nature of the contact between two surfaces is markedly influenced by their roughness. Whenever two conductors are brought into physical contact, their surfaces touch first at those points where the tips of the asperities on one meet those on the other. The intense local pressure produced by this contact causes the metal in these tiny points to deform. Even when the initial process of deformation is completed, however, the major part of the two surfaces will still be separated by distances which are very large compared to the range of atomic forces; they will be held apart except at a few small areas where true intimate contact occurs.

When an electric current passes between two contacting surfaces, the flow of charge is greatly constricted at the interface as it is forced to pass through the few small areas which are in true contact. Because of this constriction, the potential difference across the interface will exceed by a small amount that which would have been produced by the same current flowing uniformly. The constriction thus gives rise to an additional potential drop in the electrical circuit formed by two contacting bodies. This potential drop, divided by the current value may be defined as the "constriction resistance."

It is becoming known that constriction resistance considerations seriously affect the nature, quality and life expectancy of an electrical connection. This is believed to be due to heating effects caused by the current constriction and to the concommitant effect of such heating or temperature sensitive chemical reactions which tend to build up dielectric films between contacting bodies. Prior to this invention it has been highly difficult and impracticable to measure constriction resistance outside of specialized laboratories under specific conditions. In any given electrical connection, the constriction resistance may be regarded as being in series with the bulk resistance of the conducting bodies, yet there is no way to readily locate the physical boundary between the two. Since the total constriction resistance in actuality represents a great many individual resistances acting in parallel, the problem of placing a boundary line between bulk resistance and constriction resistance in a given connection is even further complicated. The prior art method of determining constriction resistance at the interface between two specially prepared samples of the same or different materials is known as the "crossed rod" technique. This technique employs two rods, each of known material, which are positioned transversely or "crossed" so as to contact each other at one common point. The constriction resistance of two such rods is determined by a four-wire system in which a known current is passed through the series circuit formed by one leg of each rod and the common contact point. Connecting the leads from a potential measuring device to the remaining free end of each rod thus permits measurement of the potential drop across the contact point interface alone. The constriction resistance of the interface is then determined as the potential drop divided by the impressed current.

It can thus be seen that the prior art method of measuring constriction resistance through the use of crossed rods, cannot be practically applied to all configurations of electrical joints.

Accordingly, it is an object of this invention to provide a method and apparatus for determining the constriction resistance at the interface between two contacting conductive bodies independently of their shape.

It is a further object of this invention to provide a method and apparatus for the type described, which may be employed for the stated purpose without special preparation of the conductive bodies being tested.

Still another object is the provision of a constriction resistance determining apparatus which is relatively inexpensive to construct, simple to apply and easy to understand.

A feature of this invention involves the passage through a pair of contacting conductors of an electrical pulse having a shape and value adapted to produce a change in the constant current potential drop through said contacting conductors; and correlating the value of the change in potential with the value of the pulse which produced it, to determine the constriction resistance between said conductors.

These and other objects, features, and advantages of this invention are more clearly described and specifically pointed out in the following specifications and claims and in the accompanying drawings, in which:

FIGURE 1 represents a schematic diagram of an apparatus adapted for the determination of constriction resistance in accordance with this invention;

FIGURE 2 is a conceptual representation of the electrical resistances presented by a pair of contacting conductive bodies;

FIGURE 3 is a simplified circuit diagram showing the non-standard elements of the apparatus illustrated in FIGURE 1; and FIGURE 4 is a timing chart representing the actual sequence of operation of the elements illustrated in FIGURE 1.

It has been mentioned above and is schematically suggested by FIGURE 2, that two contacting bodies (represented generally by reference numerals 10 and 12) may be in turn represented electrically by a pair of bulk resistances $R_b$ which are interconnected in series with a plurality of parallel-connected constriction resistances $R_c$. In previously known connection evaluation techniques, there was no way for apparatus connected between outer connection points 64 to separate $R_c$ from $R_b$.

This invention however, rests on the inventor's concept of a difference which can be used to distinguish constriction resistance in a circuit from bulk resistance: in short, this invention proposes utilization of the differing rates at which electrical resistance heating affects the temperatures of the bulk of a conductor in a circuit, and the region surrounding the constrictions. The thermal response time of the constriction region in a circuit is generally measured in microseconds, while the bulk of a connection as a whole may require several seconds to achieve a similar temperature change. Thus, it has been found that an electrical current pulse lasting a few milliseconds will cause thermal changes in the constrictions of a connection without affecting the temperature of the bulk.

The following describes a method and apparatus adapted to utilize this finding in determining constriction resistance.

Referring now more particularly to the drawings, FIGURE 1 shows a pair of contact elements 10 and 12 coupled to apparatus adapted to perform in accordance with this invention. The contact elements, shown schematically, can be seen to be in contact through stylized asperities 14, and each may also be seen to include a bulk portion 16 on which the constrictions 14 are formed.

The apparatus associates with contacts 10, 12 is shown to include a power supply 18 a current limiting means 20, a pulse generator 30, a pulse switch 40 for releasing pulses from generator 30, an operable control 50 for actuating switch 40, a voltmeter 60 for indicating potential and potential changes across the connection under test, and a source of constant current 62 coupled substantially in parallel with meter 60. Operation of this apparatus may be most readily understood by reference to FIGURE 3, which shows the non-standard portions of FIGURE 1 in circut element form.

The power supply 18 may be any commercially available, adjustable direct current unit capable of supplying continuously variable voltage over a range, for example, from 0–200 volts. As will be evident from the circuitry, to be described, the selected voltage output of supply 18 at any time, will determine the amplitude of the pulses produced by the combined apparatus. A simple current limiter device 20 may be provided on the output of supply 18 if the supply does not include built-in internal limiting for avoiding overload problems. The limiter, as illustrated in FIG. 3 comprises simply a PNP transistor 22 negatively biased through a base resistor 24 and connected in series between the postive output lead of supply 18 and the input to generator 30, to limit the magnitude of the charging current drawn by the generator.

Pulse generator 30, as illustrated, comprises simply a charge storage capacitor 32 which is coupled to an L-C tank circuit 34 including inductance 36 and capacitance 35. When transistor 22 is in its "on" condition, storage capacitor 32 is charged directly by power supply 18. When it is fully charged, and the limiter transistor 22 has ceased to conduct, the storage capacitor will continue to retain its full charge until pulse switch 40 is "turned on." When switch 40 is "on" the full charge of capacitor 32 will be connected, through tank circuit 34, generator output lead 38, and switch 40, across contact test terminals 48, 49. The L-C circuit 34 serves to form the desired pulse shape; preferably, the duration of the pulse should be significantly less than the thermal response time of the bulk of a given connection.

Switch 40, as shown, comprises a silicon-controlled rectifier (SCR) of commercially available type which includes an output lead 44 and a triggering lead 43. When the SCR is in its non-conducting condition, no charge can flow through generator output lead 38. The switch can be turned on by a pulse applied to triggering lead 43.

Switch control 50 serves to provide the pulse necessary for actuating switch 40. The control circuit includes a source of potential 56, a pulsing capacitor 54, a manually operated switch 52 and a return-path resistor 55. When manual switch 52 is closed to complete a path through resistor 55, the charging current from source 56 through capacitor 54 produces an initial potential change at SCR lead 43, which serves to trigger that element to its conducting condition. Since capacitor 54 stores a charge while triggering lead 43, shorting resistor 58 is provided to discharge the capacitor upon return of switch 52 to the position illustrated in FIGURE 3.

The timing chart of FIGURE 4 illustrates the relative sequence of operation of the switch control 50, the switch 40, and pulse generator 30. Thus, closing of manual switch 52 produces a relatively short "trigger" pulse at time A. The trigger pulse then turns switch 40 to "on" position; that in turn releases a pulse from the pulse generator 30 which has a time duration from A to B. Final decay of the generator pulse at time B simultaneously switches the SCR 42 in switch 40 to "off" condition. The three elements are then ready for release of another pulse from generator 30.

The purpose of the apparatus thus far described is the production of sequentially releasable pulses of desired shape and selectively controllable amplitude. While specific apparatus has been described, it should be understood that other circuits, equipment, and embodiments may be equally effectively used without departing significantly from the scope of this invention. It is, for example, assumed in the illustrated embodiment that the output control of power supply 18 has been calibrated so that for any given output, the amplitude of the pulse ultimately produced between terminals 48 and 49 is known. But any other convenient method of determining the pulse amplitude, obvious to one skilled in the art, may also be used without affecting the operation of this invention.

Thus it has been shown that a pulse or sequential pulses of known and selectively varying amplitude may be applied across a pair of contacting conductors 10 and 12 which are connected between test contact leads 48 and 49. The contacting conductors 10 and 12 represented in FIGURE 1 are shown to be in contact at a pair of stylized asperities 14 which represent constriction points. Also connected substantially in parallel across leads 48 and 49 are a source of constant current 62 and a voltmeter 60. The voltmeter is provided for the purpose of indicating potential drop across the series circuit formed by contacting bodies 10, 12. Constant current source 62 serves to provide the current flow necessary for detecting relative potential drop across the contacting bodies. The source is preferably of the constant current type for convenience in detecting changes in potential; alternatively, however, a nonconstant source may be used, but a means for determining the current flow at the time of each voltmeter reading must then also be provided.

It may now be seen that the embodiment of this invention illustrated in the drawings and described herein provides for the application, to two contacting bodies, electrical pulses of constant or sequentially increasing known amplitude; and also provides for determining the potential drop across the two bodies both before and after any given pulse. In use, an operator of this apparatus would couple the two contacting bodies to be tested to the test leads such as 48 and 49. The potential drop through the two bodies would then be noted at a known current. A pulse of known amplitude and duration would then be passed through the bodies, and the potential drop would subsequently be measured again at a known current to detect any change caused by a change in the resistance of the circuit. The process of measurement and pulsing would continue until such a change was noted. At that point the value of the pulse which first produced permanent change in the connection resistance would be known. This data has been found to be indicative of the constriction resistance of any two contacting conductive bodies as follows:

It has been noted that pulses of the proper time duration, applied as above, will produce transient temperature changes in the region of the constrictions between two bodies without affecting the bulk temperature. It has been determined that a transient temperature change of sufficient magnitude will cause a permanent change in the affected constrictions without affecting the bulk resistance of a connection. Thus when a change in the overall resistance of a given connection is noted by use of the apparatus of this invention it is actually a change in the constriction resistance which has been detected.

The pulse current which first produces a permanent change in the construction resistance of two contacting bodies has been defined as the "critical current."

It was previously known that for two given conductors in contact, the product of the critical current and the constriction resistance is a constant. That constant, which may be seen to have the units of voltage, has been defined as the "melting voltage." The melting voltage is a constant which depends upon the material or materials in contact. That is, gold-to-copper connections, for example, will all be characterized by the same melting voltage; but that constant value will differ from the melting voltage of a copper-to-copper connection.

It should now be apparent that if the melting voltage constant for two contacting conductors is known, and the critical current for two corresponding bodies has been determined in accordance with this invention, the constriction resistance between those two bodies may be readily determined by dividing the melting voltage by the critical current.

Melting voltage values for contacting bodies of any given material or different materials may be simply obtained by means of the known techniques described in reference such as Electric Contacts Handbook, Ragnar Holm (1958, Berlin: Springer).

As a further advantage of this invention, the constriction resistance of two contacting bodies for which the melting voltage is known may be measured by means of a single electrical pulse of known critical value considered with reference to a graphic representation of Constriction Current times Constriction Resistance equals a Constant. The representation must be plotted on logarithmic coordinates for the materials being measured. Then, for any critical current pulse value of two contacting bodies determined in accordance with this invention, the corresponding constriction resistance of the bodies following the given pulse may be read directly from the graphic plot. And similarly, if the change in potential drop caused by that pulse is measured, the change in constriction resistance may be determined, and the value which the constriction resistance had prior to that pulse may then be read from the graph.

This invention has thus been described but it is desired to be understood that it is not confined to the particular forms or usages shown and described, the same being merely illustrative, and that the invention may be carried out in other ways without departing from the spirit of the invention, and therefore, the right is broadly claimed to employ all equivalent instrumentalities coming within the scope of the appendant claims, and by means of which objects of this invention are attained and new results accomplished, as it is obvious that the particular embodiments herein shown and described are only some of the many that can be employed to obtain these objects and accomplish these results.

I claim:

1. The method of determining the electrical resistance present at the interface between two contacting bodies having a characteristic melting voltage comprising the steps of: establishing an electrical current flow through two contacting bodies; measuring the relative overall potential drop across the series circuit formed by two contacting bodies in response to the electrical current flow; passing an electrical pulse of known current amplitude through the said series circuit to effect a permanent change in resistance of the said series circuit; measuring the potential drop of said series circuit following the electrical pulse to determine that a permanent change in potential drop significantly less than the overall potential drop has occurred; dividing the melting voltage of said bodies by the current amplitude of said pulse to obtain the resistance present at the interface between the two bodies being tested.

2. The method of claim 1 wherein said electrical pulse of known current amplitude is followed by application of a sequence of pulses of the same amplitude to ascertain that no further potential changes are caused thereby.

3. The method of claim 1 wherein a plurality of pulses of sequentially increasing known amplitudes are applied to the series circuit formed by the two contacting bodies, and the potential drop across the series circuit is measured before and after each pulse to ascertain the specific pulse which first causes a permanent change in said potential drop; and wherein the amplitude of said specific pulse is employed to obtain the resistance present at said interface.

4. The method of claim 3 further including the step of continuously passing a constant current of amplitude less than the amplitude of said pulses through the series circuit formed by two bodies under test to facilitate sequential determinations of potential drop.

5. Apparatus for determining the amplitude of an electrical current pulse which will alter the electrical constriction resistance present at the interface between two contacting bodies independently of the bulk resistance of the bodies, said apparatus comprising:

a pair of test points having connecting means for electrically connecting a test circuit, including two conductive bodies having a common contact interface, between said test points in electrical series relationship;

a source of electrical current coupled to pass a substantially constant current, of known amplitude, through the common contact interface of a test circuit connected between said test points to produce a potential drop across the test circuit;

means operable to electrically heat the electrical constriction resistance present at the common contact interface of a test circuit, sufficient to produce melting thereof, during a period substantially less than the thermal response time of the conductive bodies in the test circuit;

said means to electrically heat including a controllable electrical current generator to pass an electrical current pulse, of known amplitude, through a test circuit connected to said test points during a period substantially shorter than the thermal response time of the conductive bodies in the test circuit; and potential change detection means coupled to said test points for indicating the presence of a difference between the potential drop across a test circuit before operation of said electrical current generator and the potential drop across that test circuit after operation of said generator;

whereby the determined electrical current pulse amplitude which first preceeded detection of a change in potential drop across said pair of test points may be related to the known melting voltage of the bodies in the test circuit in accordance with Ohm's Law to determine the construction resistance present at the common contact interface of the test circuit.

6. Apparatus in accordance with claim 5 wherein said controllable electrical current generator comprises a pulse generator adapted to produce a sequence of pulses of sequentially increasing amplitude; and said potential change detection means is adapted to indicate the presence or absence of change in potential drop following each pulse in said sequence.

7. The apparatus of claim 5 wherein said pulse generating means includes an adjustable and selectable output voltage power supply, a storage capacitor adapted to be charged by said power supply, and a pulse shaping circuit for shaping the discharge from capacitor into a pulse of desired configuration.

8. The apparatus of claim 5 wherein said potential drop change detecting includes a visual measurement display means calibrated to indicate changes in construction resistance directly.

References Cited

UNITED STATES PATENTS

| | | | |
|---|---|---|---|
| 3,054,954 | 9/1962 | Boscia | 324—158 |
| 3,134,073 | 5/1964 | Dickerson | 324—158 |
| 3,259,829 | 7/1966 | Feth. | |
| 3,296,523 | 1/1967 | Haas | 324—64 XR |

OTHER REFERENCES

G.E. SCR Manual (2nd edition), December 1961, pp. 235, 236.

ARCHIE R. BORCHELT, *Primary Examiner.*

E. L. STOLARUN, *Assistant Examiner.*

U.S. Cl. X.R.

324—64